(12) United States Patent
Sip

(10) Patent No.: US 9,081,559 B2
(45) Date of Patent: Jul. 14, 2015

(54) ELECTRONIC SYSTEMS AND POWER MANAGEMENT METHODS THEREOF

(75) Inventor: Kim Yeung Sip, Taipei Hsien (TW)

(73) Assignee: ACER INCORPORATED, Taipei Hsien (TW)

( * ) Notice: Subject to any disclaimer, the term of this patent is extended or adjusted under 35 U.S.C. 154(b) by 381 days.

(21) Appl. No.: 13/550,631

(22) Filed: Jul. 17, 2012

(65) Prior Publication Data

US 2013/0106183 A1 May 2, 2013

(30) Foreign Application Priority Data

Oct. 26, 2011 (TW) .............................. 100138803 A

(51) Int. Cl.
*G06F 1/26* (2006.01)
(52) U.S. Cl.
CPC ...................................... *G06F 1/266* (2013.01)
(58) Field of Classification Search
None
See application file for complete search history.

(56) References Cited

U.S. PATENT DOCUMENTS

| 5,602,721 A * | 2/1997 | Slade et al. ................... 361/727 |
| 5,842,027 A * | 11/1998 | Oprescu et al. ............... 713/300 |
| 2007/0208892 A1 * | 9/2007 | Betts-LaCroix et al. ....... 710/62 |

* cited by examiner

*Primary Examiner* — Paul Yanchus, III
(74) *Attorney, Agent, or Firm* — McClure, Qualey & Rodack, LLP

(57) ABSTRACT

An electronic system is provided, including electronic devices, power supplies and a control module. The electronic devices each have male and female connectors, wherein the male connectors are mated with the female connectors, such that the electronic devices are overlapped in a direction and electrically connected to each other. The power supplies each are connected to one of the electronic devices, respectively, for providing power to the electronic devices. The control module has first and second modes to control the male and female connectors, wherein, in the first mode, a first electronic device of the electronic devices, which is not connected to either one of the power supplies, receives power through a first female connector of the first electronic device, and outputs power to another electronic device of the electronic devices through the first male connector.

10 Claims, 5 Drawing Sheets

ELECTRONIC SYSTEMS AND POWER MANAGEMENT METHODS THEREOF

CROSS REFERENCE TO RELATED APPLICATIONS

This Application claims priority of Taiwan Patent Application No. 100138803, filed on Oct. 26, 2011, the entirety of which is incorporated by reference herein.

BACKGROUND OF THE INVENTION

1. Field of the Invention

The present invention relates to electronic systems, and in particular relates to electronic systems having high speed transmission interfaces.

2. Description of the Related Art

Recently, computers and networks make many innovative functions more effective. New peripheral devices, such as internet units and external storage units, can easily be connected to computers or notebooks. However, there are various peripheral devices connected to the host (e.g., computer). Thus, there is a need for an electronic system and a power management method thereof to increase the stability of power supplies.

BRIEF SUMMARY OF THE INVENTION

In light of the previously described problems, the invention provides an embodiment of an electronic system, comprising a plurality of electronic devices, a plurality of power supplies and a control module. The electronic devices each have a male connector and a female connector, wherein the male connectors are mated with the female connectors, such that the electronic devices are overlapped in a direction and electrically connected to each other. The power supplies are each connected to one of the electronic devices, respectively, for providing power to the electronic devices, wherein the number of the electronic devices is larger than the number of the power supplies. The control module has a first mode and a second mode to control the male connectors and the female connectors, wherein, in the first mode, a first electronic device of the electronic devices, which is not connected to either one of the power supplies, receives power through a first female connector of the first electronic device, and the first electronic device outputs power to another electronic device connected to a first male connector of the first electronic device through the first male connector.

The invention also provides a power management method suitable for an electronic system having power supplies and electronic devices each of the electronic devices having a male connector and a female connector. The method comprises the steps of: determining whether one of the power supplies is connected to a first electronic device of the electronic devices which are electrically connected to each other and are overlapped in a direction, and receiving power from another electronic device of the electronic system through a first male connector or a first male connector of the first electronic device when the first electronic device is not connected to one of the power supplies, and providing the power to the first female connector or the first male connector.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
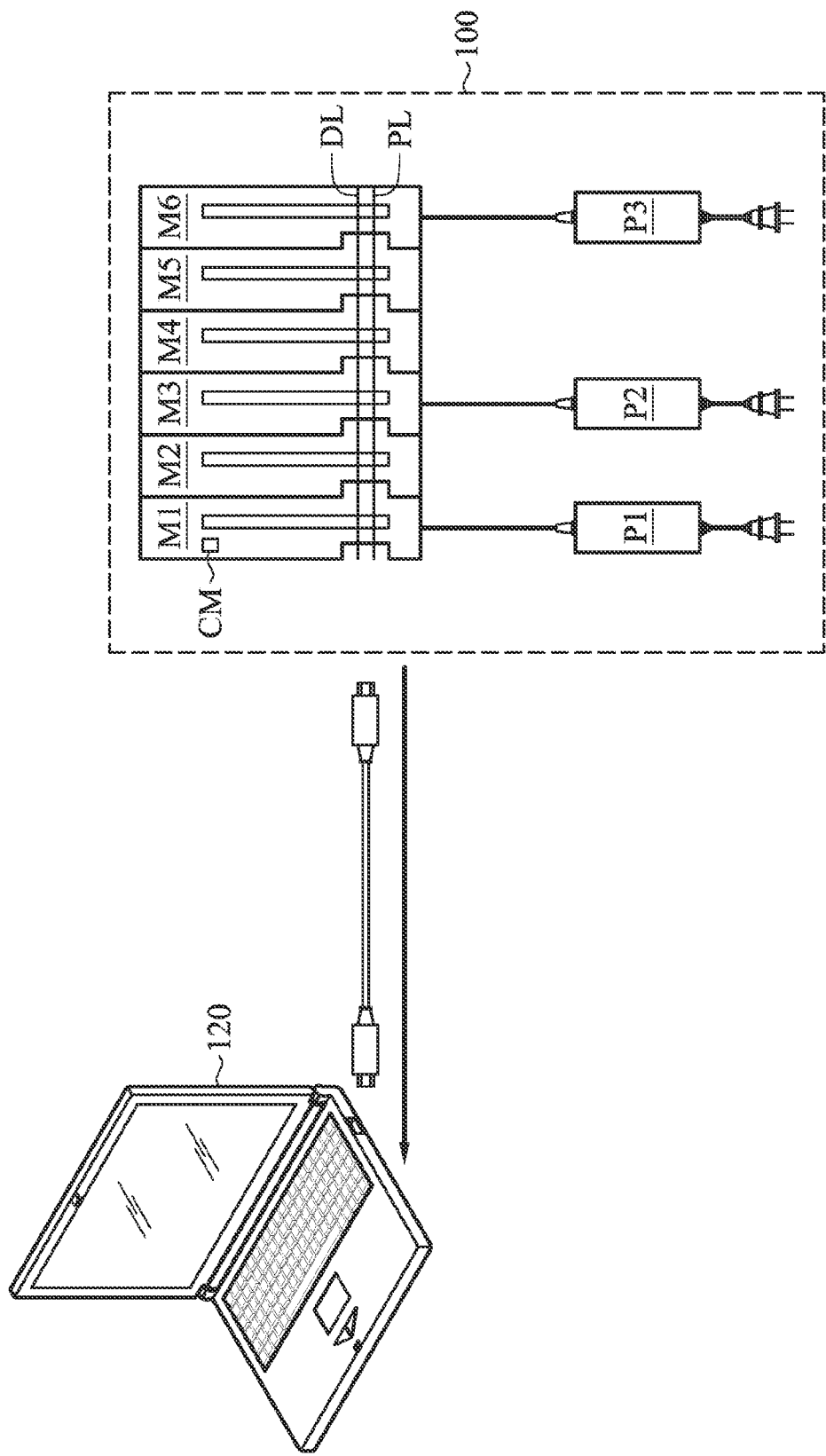
FIG. 1 illustrates a schematic view of an electronic system of the disclosure.

FIG. 1 illustrates a schematic view of the electronic system of the disclosure. As shown in FIG. 1, an electronic system 100 has electronic devices M1~M6, a control module CM and power supplies P1~P3. The two numbers of the electronic devices and the power supplies are provided for illustration, but are not limited thereto. In the embodiment, the control module CM can be disposed in one of the electronic devices M1~M6 or in a host 120 coupled to the electronic system 100 through a transmission cable, but is not limited thereto. The electronic devices M1~M6 are overlapped in a direction. In addition, each of the electronic devices M118 M6 has a high speed transmission interface, e.g., a thunderbolt interface, such that the electronic devices M1~M6 use a transport protocol compatible with a thunderbolt interface to communicate with a host 120. The electronic devices M1~M6 are coupled in a daisy-chain configuration. The data line DL is configured to deliver data when the electronic devices M1-M6 are electrically connected to each other. The male connector or the female connector of each of the electronic devices is connected to the female connector or the male connector of the other electronic device to form the power line PL, and the electronic devices M1-M6 provide power to each other through the power line PL.

Because the power from the host is limited, there is a need for additional power supplies to provide power to the electronic devices M1-M6. When there is one power supply, the only one power supply can provide power to all of the electronic devices M1-M6 or the host 120. When there are two power supplies or more than two power supplies connected to the electronic devices M1-M6, the control module CM has a first mode and a second mode to control switching units of the male connectors and the female connectors of the electronic devices M1-M6, such that each of the electronic devices can receive power through the male connector or the female connector, or each of the electronic devices can select the male connector or the female connector to output power to the adjacent electronic device.

Figure 2:
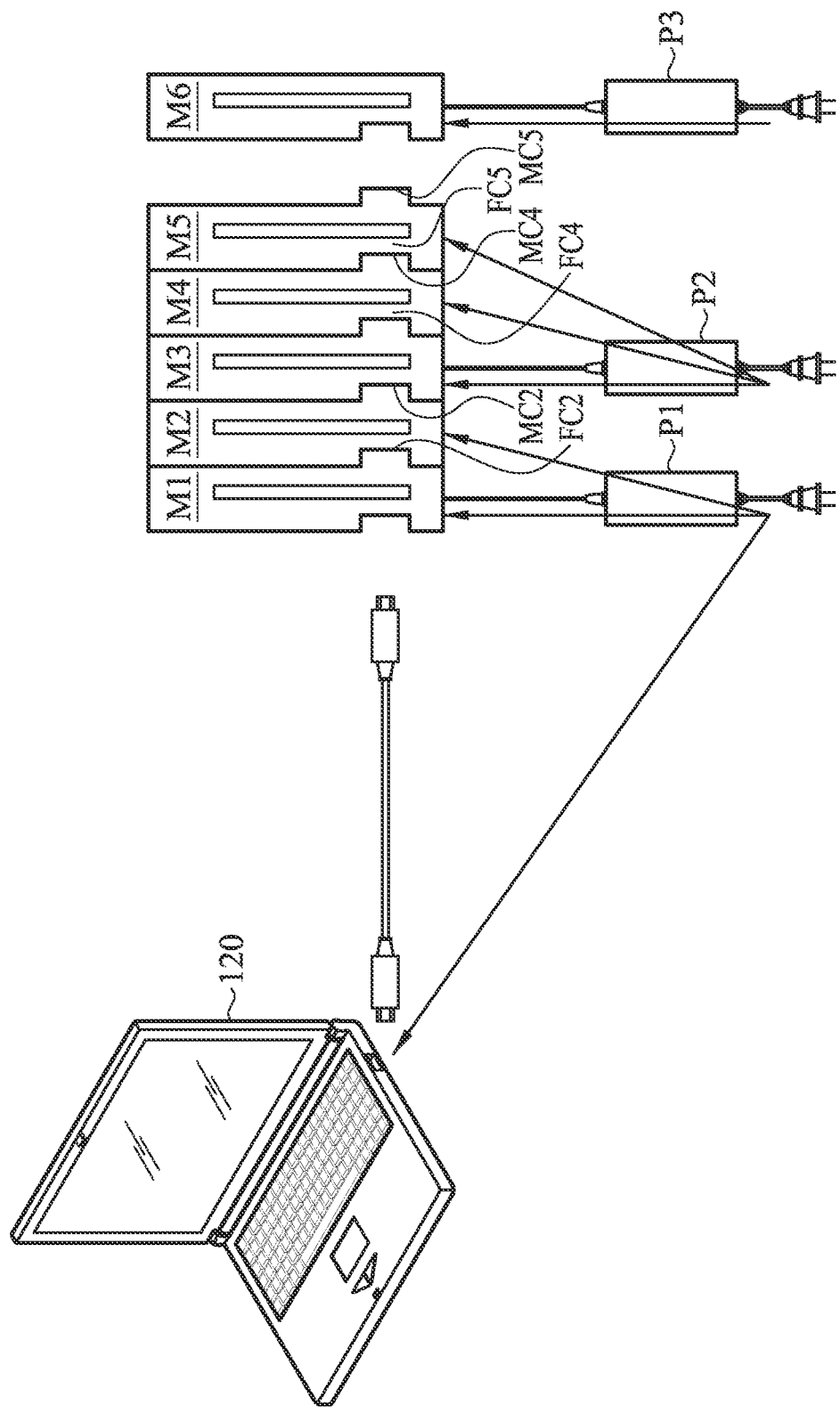
FIG. 2 illustrates an embodiment of the first mode of the disclosure.

FIG. 2 illustrates an embodiment of the first mode of the disclosure. As shown in FIG. 2, the electronic devices M1, M3 and M6 are respectively connected to the power supplies P1, P2 and P3. Therefore, the power supplies P1, P2 and P3 provide power to the electronic devices M1, M3 and M6. The electronic devices M2, M4 and M5 are not connected to a power supply. Therefore, the control module CM uses the first mode to distribute power to the electronic devices M2, M4 and M5. For example, in the first mode, the electronic device M2 receives power from the electronic device M1 through the female connector FC2 of the electronic device M2, and the male connector MC2 of the electronic device M2 outputs power to the electronic device M3 connected to the male connector MC2. Because the electronic device M3 is connected to the power supply P2, the electronic device M3 has no need to receive power from the electronic device M2. In addition, the electronic device M4 receives power from the electronic device M3 through the female connector FC4 of the electronic device M4, and the male connector MC4 of the electronic device M4 outputs power to the electronic device M5 connected to the male connector MC4. Therefore, the electronic device M5 can receive power from the electronic device M4 through the female connector FC5 of the electronic device M5. In the first mode, the power supply P1 needs to provide power to the host 120.

Figure 3:
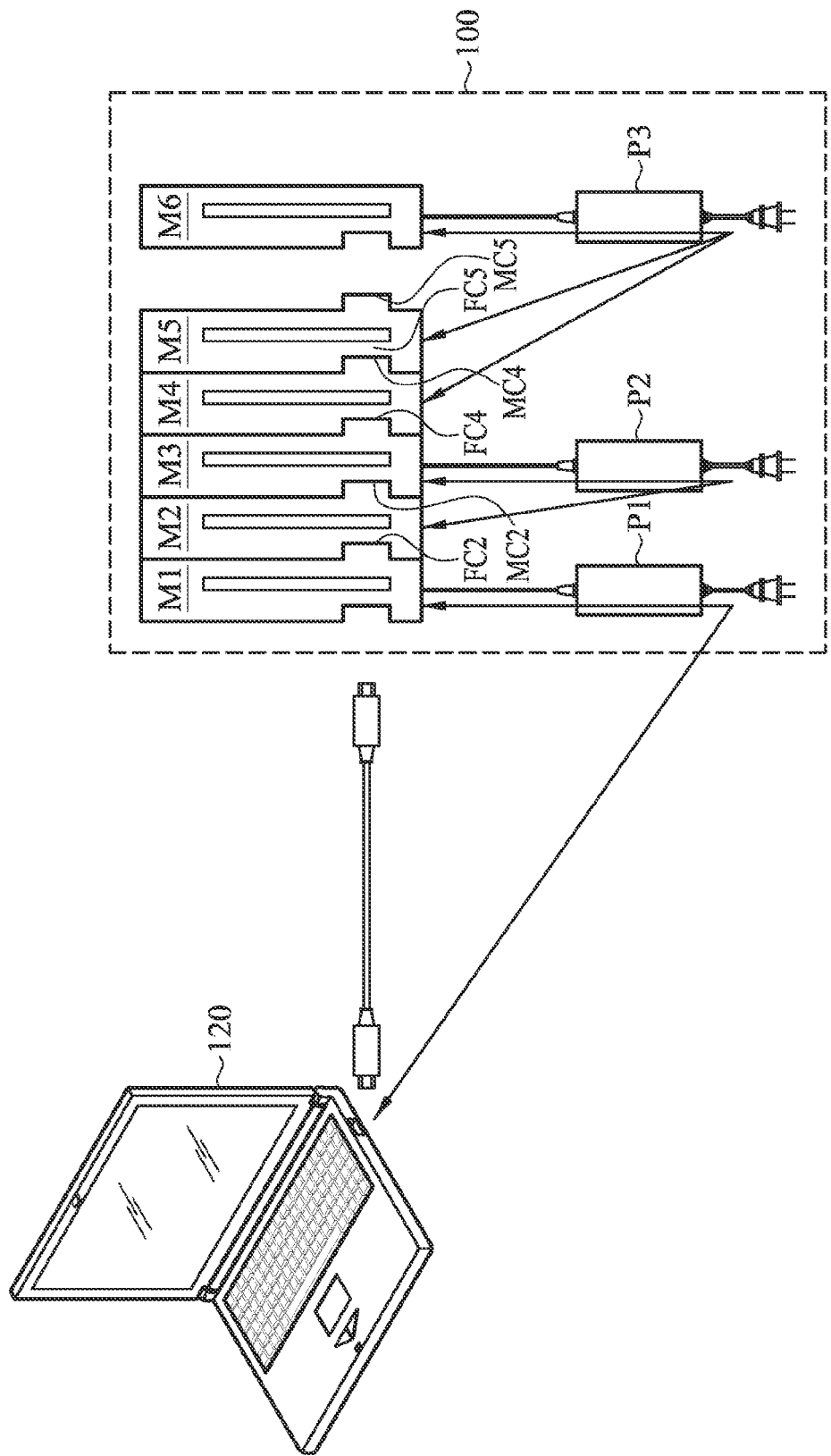
FIG. 3 illustrates an embodiment of the second mode of the disclosure.

FIG. 3 illustrates an embodiment of the second mode of the disclosure. As shown in FIG. 3, the electronic devices M1, M3 and M6 are respectively connected to the power supplies P1, P2 and P3. Therefore, the power supplies P1, P2 and P3 respectively provide power to the electronic devices M1, M3 and M6. The electronic devices M2, M4 and M5 are not connected to the power supply, and the control module CM uses the second mode to distribute power to the electronic devices M2, M4 and M5. For example. In the second mode, the electronic device M2 receives power from the electronic device M3 through the male connector MC2 of the electronic device M2, and the female connector FC2 of the electronic device M2 outputs power to the electronic device M1 connected to the female connector FC2. Because the electronic device M1 is connected to the power supply P1, the power supply P1 directly provides power to the electronic device M1, so that the electronic device M1 has no need to receive power from the electronic device M2. In addition, the electronic device M5 receives power from the electronic device M6 through the male connector MC5 of the electronic device M5, and the female connector FC5 of the electronic device M5 outputs power to the electronic device M4 connected to the female connector FC5. Therefore, the electronic device M4 can receive power from the electronic device M5 through the male connector MC4 of the electronic device M4. In the second mode, the power supply P1 needs to provide power to the host 120.

In addition, in some embodiments, the control module CM calculates output powers of all of the power supplies and finds out a first maximum output power from the all output powers in the first mode. The control module CM calculates output powers of all of the power supplies and finds out a second maximum output power from the all output powers in the second mode. The control module CM compares the first maximum output power with the second maximum output power to execute one of the first mode and the second mode corresponding to the smaller one of the first maximum output power and the second maximum output power.

For example, in the first mode, the output powers of the power supplies P1, P2 and P3 are 40 W, 20 W and 10 W, respectively. In the second mode, the output powers of the power supplies P1, P2 and P3 are 10 W, 30 W and 30 W, respectively. The first maximum output power is 40 W in the first mode, and the second maximum output power is 30 W in the second mode. Therefore, the second maximum output power is smaller than the first maximum output power, and the control module CM selects the second mode to serve as the execution mode.

Figure 4:
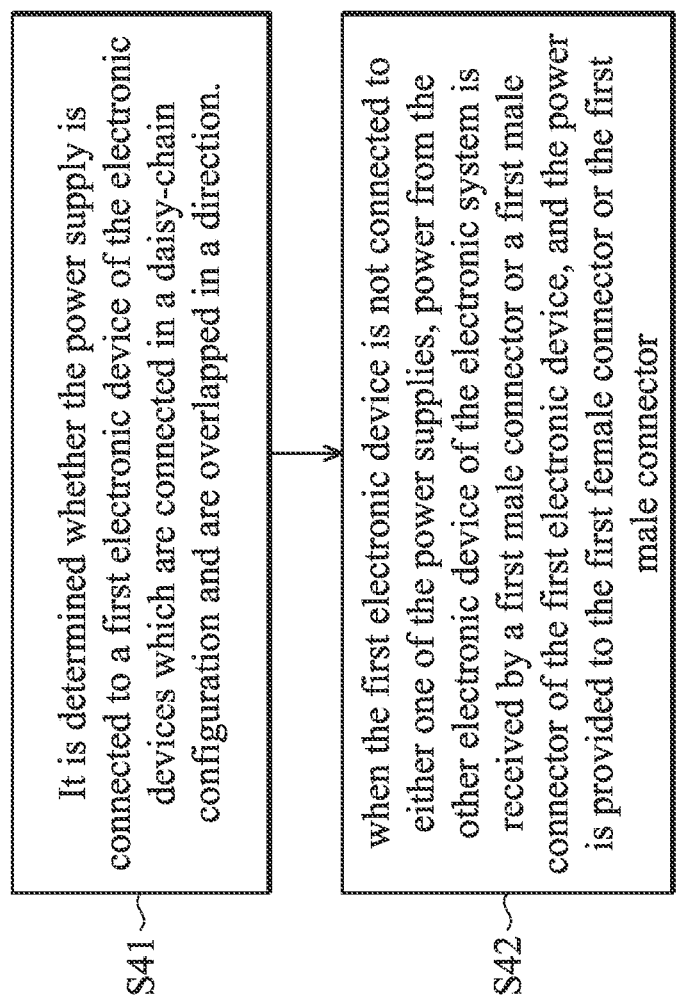
FIG. 4 illustrates a first flowchart of the power management method of the disclosure.

FIG. 4 illustrates a first flowchart of the power management method of the disclosure. As shown in FIG. 4, the power management method includes the following steps.

In step S41, it is determined whether the power supply is connected to a first electronic device of the electronic devices which are connected in a daisy-chain configuration and are overlapped in a direction. In step S42, when the first electronic device is not connected to either one of the power supplies, power from the other electronic device of the electronic system is received by a first male connector or a first male connector of the first electronic device, and the power is provided to the first female connector or the first male connector.

Figure 5:
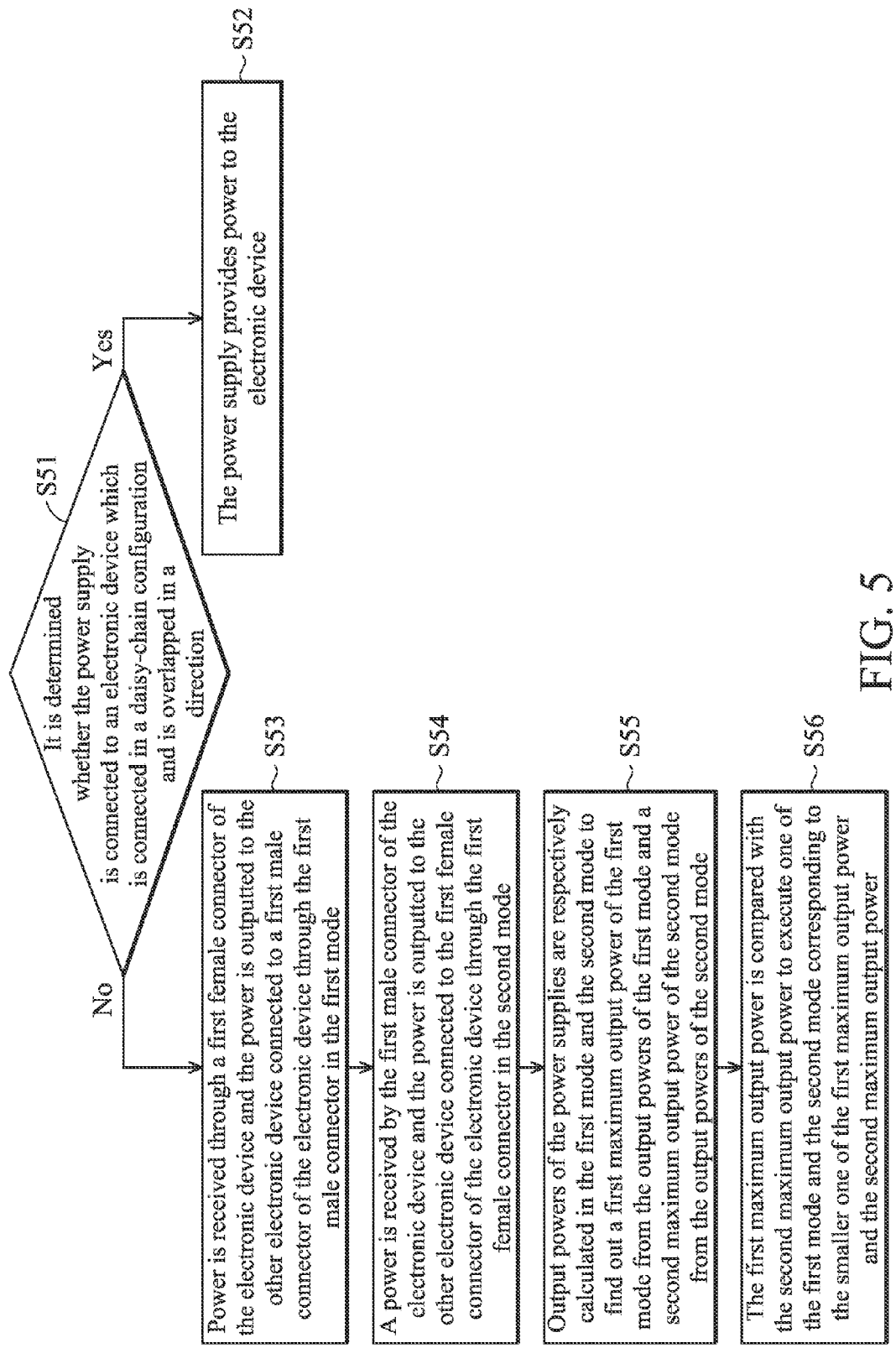
FIG. 5 illustrates a second flowchart of the power management method of the disclosure.

FIG. 5 illustrates a second flowchart of the power management method of the disclosure. As shown in FIG. 5, the power management method includes the following steps.

In step S51, it is determined whether the power supply is connected to an electronic device which is connected in a daisy-chain configuration and is overlapped in a direction. When the electronic device (e.g., the electronic device M1) is connected to the power supply, the procedure enters step S52, wherein the power supply provides power to the electronic device. When the electronic device (e.g., the electronic device M2) is not connected to either one of the power supplies, the procedure enters step S53, power is received through a first female connector of the electronic device and the power is outputted to the other electronic device connected to a first male connector of the electronic device through the first male connector in the first mode. In step S54, a power is received by the first male connector of the electronic device and the power is outputted to the other electronic device connected to the first female connector of the electronic device through the first female connector in the second mode. Note that steps S53 and S54 are permutable.

In step S55, output powers of the power supplies are respectively calculated in the first mode and the second mode to find out a first maximum output power of the first mode from the output powers of the first mode and a second maximum output power of the second mode from the output powers of the second mode. In step S56, the first maximum output power is compared with the second maximum output power to execute one of the first mode and the second mode corresponding to the smaller one of the first maximum output power and the second maximum output power.

In summary, the electronic system and the power management method of the disclosure can effectively manage the power outputted by the power supplies, and select the smaller one of the maximum output powers of the first and second modes to increase the stability of the electronic system 100.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An electronic system, comprising:
   a plurality of electronic devices, each having a male connector and a female connector, wherein the male connectors are mated with the female connectors, such that the electronic devices are overlapped in a direction and electrically connected to each other;
   a plurality of power supplies, each connected to one of the electronic devices, respectively, for providing power to the electronic devices, wherein the number of the electronic devices is larger than the number of the power supplies; and
   a control module, having a first mode and a second mode to control the male connectors and the female connectors;
   wherein, in the first mode, a first electronic device of the electronic devices, which is not connected to either one of the power supplies, receives power through a first female connector of the first electronic device, and the first electronic device outputs power to another electronic device connected to a first male connector of the first electronic device through the first male connector, wherein the control module calculates output powers of the power supplies in the first mode and finds out a first maximum output power from the output powers of the first mode, and the control module calculates output powers of the power supplies in the second mode and finds out a second maximum output power from the output powers of the second mode.

2. The electronic system as claimed in claim 1, wherein a first power supply of the power supplies provides power to a second electronic device which is connected to the first power supply, such that the second electronic device outputs power to another electronic device connected to a second male connector or a second female connector of the second electronic device.

3. The electronic system as claimed in claim 1, wherein, in the second mode, the first electronic device of the electronic devices receives power through the first male connector, and the first electronic device outputs power to another electronic device connected to the first female connector, by the first female connector.

4. The electronic system as claimed in claim 1, wherein, when the first maximum output power is larger than the second maximum output power, the control module controls the first male connector and the first female connector according to the second mode.

5. The electronic system as claimed in claim 1, wherein when the second maximum output power is larger than the first maximum output power, the control module controls the first male connector and the first female connector according to the first mode.

6. A power management method, suitable for an electronic system having power supplies and electronic devices, each of the electronic devices having a male connector and a female connector, the method comprising:

determining whether one of the power supplies is connected to a first electronic device of the electronic devices which are electrically connected to each other and are overlapped in a direction;

receiving power from another electronic device of the electronic system through a first male connector or a first male connector of the first electronic device when the first electronic device is not connected to one of the power supplies, and providing the power to the first female connector or the first male connector; and calculating output powers of the power supplies in the first mode and the second mode, respectively, to find out a first maximum output power of the first mode from the output powers of the first mode and a second maximum output power of the second mode from the output powers of the second mode.

7. The method as claimed in claim 6, further comprising: providing power to a second electronic device of the electronic devices by one of the power supplies when the second electronic device is connected to the power supply.

8. The method as claimed in claim 6, comprising:

in a first mode, receiving power through the first female connector and providing power to another electronic device connected to the first male connector of the first electronic device, through the first male connector.

9. The method as claimed in claim 8, comprising:

in a second mode, receiving power through the first male connector and providing power to another electronic device connected to the first female connector of the first electronic device, through the first female connector.

10. The method as claimed in claim 6, further comprising:

comparing the first maximum output power with the second maximum output power to execute one of the first mode and the second mode corresponding to the smaller one of the first maximum output power and the second maximum output power.

\* \* \* \* \*